May 17, 1960   W. C. THUERWACHTER   2,936,679
METHOD FOR CUTTING METAL
Filed July 2, 1956   5 Sheets-Sheet 4

INVENTOR.
Walter C. Thuerwachter
BY
Carlson, Pitzner, Hubbard & Wolfe
Attys

United States Patent Office 2,936,679
Patented May 17, 1960

2,936,679

METHOD FOR CUTTING METAL

Walter C. Thuerwachter, Fond du Lac, Wis., assignor to Giddings & Lewis Machine Tool Company, Fond du Lac, Wis., a corporation of Wisconsin Application July 2, 1956, Serial No. 595,309

3 Claims. (Cl. 90—24)

This application is a continuation-in-part of my co-pending application Serial No. 500,151, filed April 8, 1955, now abandoned.

The present invention has as a general object the provision of an improved method of machining using carbide cutting tools having tool angles selected to promote more efficient cutting. This result is obtained in one aspect, by causing a new type of negative rake cutting to take place in metal. It has been standard practice, heretofore, to use cutting tools in both positive and negative rake positions. Furthermore, it is popularly believed and commonly explained, that the contrast between the cutting action produced in these different positions is essentially the difference between "shearing" off material, the action which it is conceived occurs in the positive rake position, as compared with "crushing" or "pushing" the material off, the action which it is generally conceded occurs with the tool in the negative rake position. Thus, in the negative rake position, a much thicker chip may be removed, although considerably greater power is required from the machine itself as well as ability of it to withstand greatly added loads. With carbide cutting materials, the generic name for the various sintered carbide materials which have been developed for cutting tools, it has been found particularly desirable to use negative rake angles. The reason ordinarily given for this is that the carbides while called "miracle" cutting materials for being second only to diamonds in hardness, and temperature and abrasive resistant, suffer somewhat in a comparison with previously known tool materials by reason of being brittle and having low tensile strength. By using a negative rake angle more material may be caused to lie behind the cutting edge, obtaining superior support for the cutting edge by way of a reinforcing of it and as a consequence, the result that the tool bit itself is more resistant to failure by cracking. The negative rake angles which have been recommended for carbide cutting tools heretofore, have been selected to provide this improved support or reinforcing of the cutting edge, but the angles are such that the cutting action of the tool bit may be described as aforesaid, as a "crushing" action, or as a "scraping" or "pushing" action. Such negative rake cutting is accompanied by increased tool loads and as a corollary to that, considerably greater power is required from the machine to produce the high surface speeds used in machining with carbide tools.

It is a principal object of the present invention to provide a method of machining ferrous metals using a carbide cutting tool with a tool face oriented at a negative rake angle so selected as to obtain not only superior backing for the cutting edge, which it is commonly agreed is required for carbide bits, but also producing in tool operation a new type of negative rake cutting which can be best likened to the popular conception of the cutting action that follows with a large positive rake angle for the cutting tool face, that is to say, a type of "shearing" cutting action, which requires less power.

The negative rake angles employed to produce this new type of negative rake cutting depend upon the particular metal being machined. The present invention, therefore, is concerned with the selection of these negative rake tool angles, and with the discovery that by selecting particular rake angles for particular metals to be machined, that the tool element may be caused to produce this new type of negative rake cutting which will be termed a progressive cleavage or fracture, lying in the plane of cut (the plane of the machined surface) and leading the cutting edge.

In a more limited aspect, it is an object of the present invention to provide a method of machining particularly suited for planing operations using a single point cutting tool having a bit of sintered carbide with tool angles selected to operate most efficiently in the removal, during planing operations, of layers of cast iron or certain grade steels. Therefore, while the invention is in its broadest aspect concerned with determining and fixing the required orientation and arrangement of the tool face and cutting edge of a carbide cutting tool to obtain and maintain improved cutting action, and this depends upon the particular metal to be machined, the tool illustrated in the drawings and in connection with which the present invention is to be described, is known to have superior operating characteristics as compared with tools designed in keeping with conventional practices for machining grey cast iron and certain grade steels. This is attributed in part to the means for supporting the tool bit itself in cutting position.

Accordingly, it is another object to provide a method of machining using a carbide cutting tool comprised of a carbide tool bit and a tool holder embodying a clamping arrangement for holding the bit in place, where the orientation of the bit surfaces and the tool holder supporting surfaces for the bit is such as to provide improved backing for the cutting edge while allowing slight relative movement between the parts to accommodate for expansion and retraction experienced at the tremendously high temperatures produced at the surface speeds employed in machining with carbides. Furthermore, the face of the tool bit is inclined at a negative true rake angle producing improved cutting, now attributed to the discovery that this tool bit causes the plane of shear in advance of the cutting edge to lie substantially in the surface left by the cutting edge, such that the shear stresses developed in the workpiece cause a progressive cleavage leading the cutting edge, reducing load on the tool and therefore, making it possible to operate the tool at higher cutting speeds with less power.

Other objects and advantages of the invention will become apparent from the following detailed description taken in connection with the accompanying drawings, in which.

While the invention is susceptible of various modifications and alternative constructions, there has been shown in the drawings and will herein be described in detail, one embodiment of the invention applied to planing metal by means of a single point cutting tool, which is typical of the metal-removing processes in which the invention may be utilized. It is to be understood that it is not thereby intended to limit the invention, but it is intended to cover all modifications, alternative constructions and equivalents falling within the spirit and scope of the invention as expressed in the appended claims.

The discovery on which the present invention is based may best be explained by reference to Figures 1 and 2, 10–15, and the photomicrographs illustrated in Figures 18, 19 and 20. These figures will be employed in describing how a carbide cutting tool may be constructed to obtain improved cutting action by adopting particular angles for the tool face and cutting edge included in the tool. Preliminary to this, however, it is believed desirable to point out that in one of its aspects, the present invention is based on the discovery that a new and novel type of negative rake cutting may be caused to occur by the adoption of particular angles for the tool face of the carbide tool bit.

Preliminary to a complete disclosure and analysis of this discovery, it is believed that it will be helpful to set forth briefly a few points concerning carbide cutting tools and their manner of operation.

First concerning the term "carbide," this is a common term used in industry to designate various types of sintered carbides. These sintered carbides are the product of powder metallurgy, and generally include tungsten carbide, variations of tungsten carbide such as tungsten-tantalum carbide mixtures, silicon carbides and boron carbides being the remaining commonly known and used carbide materials.

These carbides are produced by sintering the powdered constituent materials to the form of small pieces. Once formed and heated, the material cannot be cast or heat-treated. However the pieces can be cut with a diamond wheel and ground with various abrasives to almost any shape of tool bit, obtaining sharpness at the cutting edge and any finish required. The tool bits are then mounted on tool shanks, or tool holders, which normally are of cold rolled steel, the tool holders providing the necessary backing and support for the carbide bits. Carbide as a material is very brittle and low in tensile strength, and thus requires a rigid and sturdy backing to resist cracking and fracturing the result of shocks and other stresses.

It has also been found that with carbide tool bits if the tool face is formed with a negative rake angle, additional support is afforded to the cutting edge, making it greatly resistant to cracking and resulting in longer cutting edge life even at increased surface speeds.

It is generally explained, and commonly theorized, that negative rake cutting may be contrasted with positive rake cutting, by drawing the analogy that positive rake cutting action is similar to that which is produced by a cold chisel shearing metal off a workpiece. Negative rake cutting, on the other hand, is most closely analogous to that occurring with a scraping tool, although the tool face rather than being vertical as with a scraper, is actually forwardly inclined with respect to the work. In explaining and describing the type of cutting action which is produced with negative rake cutting, it is commonly explained and described that rather than "shearing" material off, as has been explained occurs with positive rake cutting, with negative rake cutting the material is "crushed" or "pushed" off. With this action taking place, a much thicker chip may be removed, although substantially greater power is required from the machine accompanied with greater loads. Since carbides are capable of withstanding considerably higher working temperatures than cutting materials known before, and as well, carbides are much harder and abrasive resistant, the cutting edge of a carbide tool bit will last considerably longer at higher cutting speeds than was possible with cutting tool bits formed of high-speed tool steels, the finest cutting material previously known.

With either positive or negative rake cutting, it is again generally theorized that when a cutting tool engages the workpiece, the material ahead of the cutting edge at first is compressed, and escapes by flowing upwardly in a direction generally parallel to the face of the tool. As the tool continues to advance, the escape of material in this direction becomes increasingly difficult; the force on the tool rises; the stress on the material ahead of the tool increases and finally reaches a value great enough to cause rupture or plastic deformation. This rupture or plastic deformation is thought to occur in a plane of failure, a shear plane passing through the point of the tool and to the external corner of the chip, that is to say, through the line of intersection of the unfinished top surface of the workpiece and the leading edge of the chip formed and escaping upwardly along the tool face.

Depending on whether the material being machined is ductile or brittle will depend the type of chip produced. For example, ductile metals when machined generally produce continuous chips, unless the cutting action is accompanied with excessive chattering or the like which may destroy this continuous form. Brittle metals, such as cast-iron, on the other hand, when machined produce characteristic segmental chips. The foregoing is in some major part due to the amount of plastic deformation of the material being removed from the workpiece. This plastic deformation affects the texture of the milled surface and as well the character of the chip itself.

Generally, the types of chip produced in metal machining are considered to fall in three different classes:

(1) A segmental chip composed of a number of more or less closely joined segments of approximately equal dimensions. Segmental chip formation is generally conceived to be characteristic of brittle metals such as cast-iron, certain steels, brass and bronze. The chips removed are little distorted by compression before they break off from the parent metals, usually are in small bits, and consequently, are sometimes called discontinuous.

(2) A continuous chip where the flow of metal adjacent to the face of the tool is not greatly retarded by friction and where there is no formation of built-up edge. This type of chip results, as generally conceived, in cutting of ductile metals of greater hardness. It is generally theorized that continuous chips are removed by shear and tear, and partly by plastic flow or deformation. The material is compressed, and is sheared off in the form of a chip, and may be in the form of a continuous ribbon either straight or curled depending on the configuration or orientation of the tool angles.

(3) A continuous chip with a built-up edge. This type of chip is generally considered characteristic of soft ductile metals, where the frictional resistance to the flow of chip along the face of the tool is so great as to cause the formation of a fragment of the built-up edge along the cutting edge of the bit. It is generally considered also that in the formation of a continuous chip the material being cut may be retarded by friction on the tool face, eventually piling up into a shape resembling a cutting edge. This is called the built-up edge and evidence of its production is left on the chip itself.

For convenience, the following terms will be used in connection with the description to follow; in fact some already have been used in the description which precedes, terms commonly used in the art but on occasion afforded different definitions due to an absence of standardization in industry. These terms are applied to single point cutting tools, for the present invention will be described in connection with an exemplary tool of this type.

(1) *Side Rake Angle.*—The angle between the face of the tool and a line parallel to the top of the tool holder. It is measured in a plane normal to the top of the tool holder, and parallel to the plane of the machined surface.

(2) *Back Rake Angle.*—The angle between the face of the tool and a line parallel to the top of the tool holder, measured in a plane normal to the top of the tool holder and normal to the plane of the machined surface.

(3) *True Rake Angle.*—The angle between the face of the tool and a line parallel to the top of the tool holder, measured in a plane normal to the top of the tool holder and normal to the cutting edge itself.

(4) *Side Cutting Edge or Lead Angle.*—This angle is the angle between the straight cutting edge and the side of the tool bit or shank of the tool, and is measured in a plane parallel to the top of the tool holder.

(5) *Inclination of Cutting Edge.*—The slope of the cutting edge with respect to a plane perpendicular to the direction of tool travel, and measured in the plane of the machined surface.

For the purpose of explaining the new type of negative rake cutting that has been discovered, an analysis of the cutting action of a single point carbide planing tool will be undertaken. It is believed, however, that the principles embodied here are applicable to metal cutting with other types of cutting tools.

Figure 1:
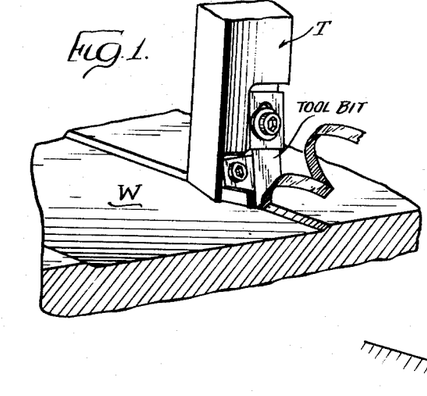
Figure 1 is a perspective view of a workpiece and carbide cutting tool operating thereon showing the manner of chip development and flow.
Figure 2:
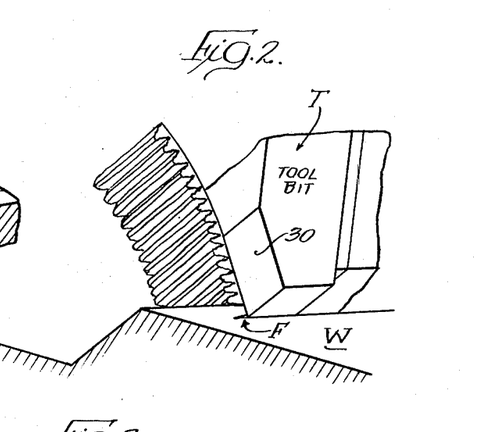
Fig. 2 is an enlarged fragmentary perspective view taken from the right hand side as viewed in Figure 1 and from above the top of the machine surface, of a workpiece in the course of planing the same by the carbide cutting tool of Figure 1 illustrating the formation of the chip and the development of cleavage leading the cutting edge.
Figure 3:
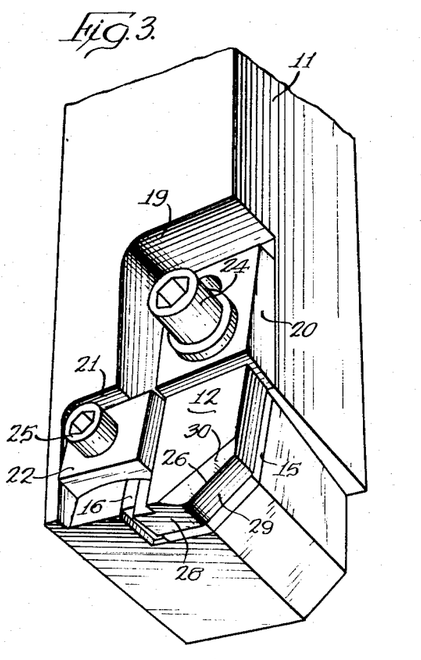
Fig. 3 is a perspective view of the carbide cutting tool shown in Figs. 1 and 2.

Referring now to the drawings, there is illustrated particularly in Figs. 1 and 2 a carbide cutting tool T for removing metal from a workpiece W. The workpiece in these figures is mounted on the translatable saddle of a planer (not shown) which saddle is moved relative to the fixed carbide cutting tool mounted over the saddle. In the course of relative movement a machined surface is formed by the cutting tool in a conventional planing operation.

Figure 9:
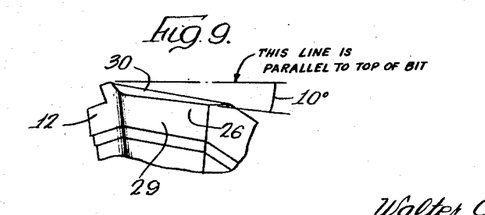
Fig. 9 is a view of the tool bit taken from the plane of lines 9—9 of Fig. 4, which is a plane parallel to the machined surface.
Figures 10, 13, 16, 17:
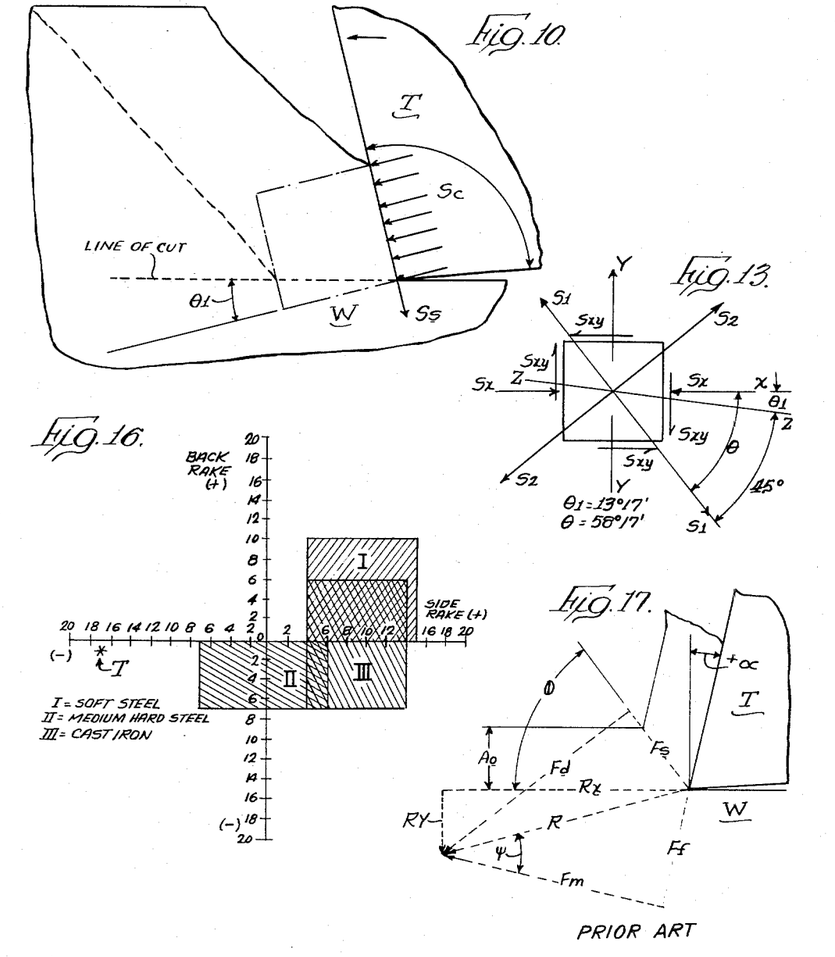
Fig. 10 is an enlarged diagrammatic view taken through the tool bit and workpiece in a plane corresponding to the plane of lines 8—8 of Fig. 4.
Fig. 13 is a like enlarged diagrammatic view of a cube of metal isolated at the tool tip, with the stresses and shears acting on it for static equilibrium.
Fig. 16 is a chart showing the relation of back rake angles and side rake angles for carbide cutting tools constructed in keeping with ordinary shop practice, as compared with the angles employed on the single point cutting tool illustrated in Figs. 3–9.
Fig. 17 is a diagrammatic illustration of the forces developed in cutting, according to conventional theory.
Figure 11:
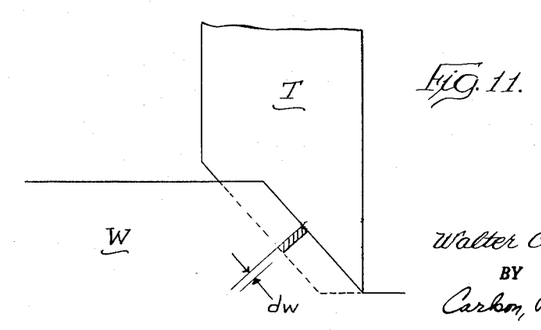
Fig. 11 is a diagrammatic end view of the tool engaging the workpiece and removing an elementary slice of metal therefrom.

Turning now to Figs. 10–15, the planing tool T operating to machine a workpiece in Figs. 1 and 2, is there depicted diagrammatically. In these figures, and in the material to follow, the tool action is considered to be orthogonal, resulting in a two-dimensional problem. This is shown in Fig. 11 where an elementary strip of the workpiece W of the width $dw$, is approached by the face and cutting edge of the tool T, the tool face having a negative rake angle as illustrated in Fig. 10. The basic cutting action of the tool occurs as the result of the work advancing against the tool face and cutting edge as shown in Fig. 10 and as is the case with a planing operation as illustrated in Figs. 1 and 2. In order to consider the tool action as orthogonal for purposes of analysis it has been assumed that the effect of the angle of inclination on the other tool angles may be ignored. The angle of inclination of the cutting edge is shown in Fig. 9 to be 10° in the present case. An analysis will be undertaken hereinafter of the forces acting on an elementary cube of metal (Fig. 11) in order to investigate the shearing action of the tool of this invention. The angle of inclination of the cutting edge does not affect the forces acting on the cube of metal; its effect is appreciable upon the disposition of the chip; and therefore this analysis and the results apply to the general case as well as the instant case where the cutting edge is slightly inclined.

Conventional theory explains metal cutting as involving a force R (Fig. 17) between the work and the tool. The rake angle $\alpha$ of the face of the tool meets the definition of "true" rake angle as defined hereinbefore, and the plane of shear failure makes an angle $\phi$ with the horizontal, the plane of the machined surface. This resultant force R may be resolved into various perpendicular components; a shear component Fs, and a direct component Fd, on the work, or a friction component Ff, along the tool face and a normal component Fn, perpendicular to the tool face. The resultant force R may also be resolved into a horizontal component Rx, and a vertical component Ry. As the energy required for one cutting stroke is the product of Rx multiplied by the length of the cut, the magnitude of the term Rx is directly related to the energy required to remove the metal from the workpiece. On the other hand, the magnitude of the component Ry of the resultant force R, produces only end thrust against the tool, and as a consequence involves no work or expenditure of energy.

In order to study the effect of the rake angle on the cutting force Rx, it is necessary to assume a shear angle $\phi$ which will be some function of the angle $\alpha$. It was first assumed that the metal of the workpiece would fail along a plane bisecting the angle between the tool and the machine surface, or $$\phi = \left(\frac{90° + \alpha}{2}\right) \qquad (1)$$

The force necessary to cause shear failure along this plane is $$Fs = SsAs = Ss\left(\frac{A_0}{\sin \phi}\right) \qquad (2)$$

And the corresponding force producing direct compressive stress in the shear plane is $$F_D = Fs \tan(\psi + \phi - \alpha) = Fs \tan\left(\psi + 45° + \frac{\alpha}{2}\right) \qquad (3)$$

Rx is composed of a component of Fs and a component of Fd.

$$Rx = Fs \cos \phi + F_D \sin \phi \qquad (4)$$

$$Rx = Fs \cos\left(45° + \frac{\alpha}{2}\right) + Fs \tan\left(\psi + 45° - \frac{\alpha}{2}\right) \sin \phi$$

$$= SsA_0\left[\cos\left(45° + \frac{\alpha}{2}\right) + \tan\left(45° - \frac{\alpha}{2} + \psi\right)\right]$$

By expansion of terms and simplification this expression for Rx may be reduced to $$Rx = SsA_0\left[\frac{2\cos(\alpha - \psi)}{\cos \psi + \sin(\alpha - \psi)}\right] \qquad (5)$$

Where
$Rx$ = horizontal cutting effort (lb.)
$Fs$ = shear strength of the metal (p.s.i.)
$Ao$ = cross-sectional area of chip in a plane perpendicular to the cut (sq. in.)
$\alpha$ = rake angle $\psi$ = friction angle = $\tan^{-1}\left(\dfrac{Ff}{Fn}\right)$ Analyzing the foregoing expression for $Rx$, it will be observed that cutting effort should be a minimum for a given material and chip size, when the quantity in brackets is a minimum. Calculations using Equation 5 indicate that positive rake angles are more favorable than negative, and this conclusion is in keeping with the generally offered theories of metal cutting, which explain that the "shearing" action produced by tools having positive rake angles is the most efficient type of cutting action at low surface speed and resultant low tool and workpiece temperatures. However, the foregoing Equation 5 cannot be applied to the condition of a negative rake and large coefficients of friction because if $$\left(\psi - \dfrac{\alpha}{2}\right)$$

becomes equal to or greater than 45°, $Rx$ may then become negative. Therefore, alternative conclusions may be drawn:

(1) The assumption that the plane of shear failure bisects the angle between the tool face and the machined surface is an erroneous one, or (2) The theory of shear failure along such a plane is incorrect.

Since the foregoing mathematical derivation based on conventional cutting theory, fails to hold for negative rake cutting and large coefficients of friction, an analysis of possible stress conditions in the material being machined at the tip of the cutting tool provides an alternative method of determining the effect of the rake angle on the cutting action.

Figure 12:
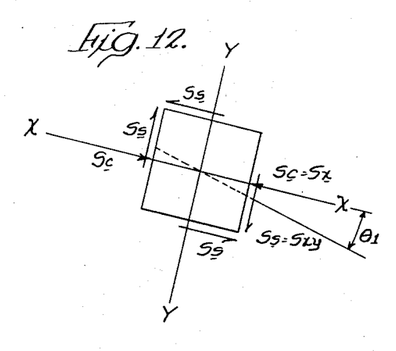
Fig. 12 is an enlarged diagrammatic view of a cube of metal isolated at the tool tip, showing certain stresses.

As illustrated in Figs. 10 and 12, compressive stresses exist at the contact surfaces between the workpiece and the tool face, while frictional force produces shear stresses downward toward the work along the face of the tool. By definition, the coefficient of friction ($u$) is the ratio of the total friction force to the total normal force. Since both forces act on the same area, the coefficient of friction becomes the ratio of these two surface stresses, or $$u = \left(\dfrac{Ff}{Fn}\right) = \left(\dfrac{Ss}{Sc}\right) \qquad (6)$$

Thus a cube of metal, isolated and diagrammatically illustrated in Fig. 12 (at the tool tip or cutting edge) is acted upon by these two stresses, that is, compressive stresses at the contact surfaces, and shear stresses due to friction. For the cube of metal to be in static equilibrium, it must be acted upon by the other shears and compressive stresses shown in Figure 13 and this case is a fundamental one of combined axial and shear loading. The direct stresses $Sx$, must be equal and opposite, and the shear stresses $Sxy$, must all be of the same intensity. The X axis is taken perpendicular to the face of the tool.

Since this is a classic case of combined stress, it is known that there are within this isolated cube of material in the chip adjacent the cutting edge, different stress intensities in different angular positions. The normal stresses become maximum on planes of "principal stress." The shear stress, on the other hand, becomes maximum on a plane which makes an angle of 45° with the "principal stress."

Furthermore, the shear stress is a maximum on a plane which makes an angle $\theta_1$ with the X axis, where $$\theta_1 = \dfrac{1}{2}\tan^{-1}\left(\dfrac{Sc}{2Ss}\right) = \dfrac{1}{2}\tan^{-1}\left(\dfrac{Sx}{2Sxy}\right) \qquad (7)$$

or, using the relation between $Sc$ and $Ss$ of the preceding Equation 6, $$\theta_1 = \dfrac{1}{2}\tan^{-1}\left(\dfrac{1}{2u}\right) \qquad (8)$$

From the foregoing it may be concluded that the angular position of the plane of maximum shear, with respect to a plane perpendicular to the tool face, is a function solely of the coefficient of friction. This relation is plotted on the chart of Fig. 14.

From this leads the discovery upon which the present invention is based. Since the orientation of the plane of maximum shear with respect to the machined surface is a function of the coefficient of friction and the true rake angle, by making the true rake angle negative and equal to the angle $\theta_1$, the position of the plane of maximum shear may be made to coincide with the plane of the machined surface. Under these circumstances, failure in shear precedes or leads the cutting edge in the plane of the cut, that is, the plane of the machined surface.

Figure 15:
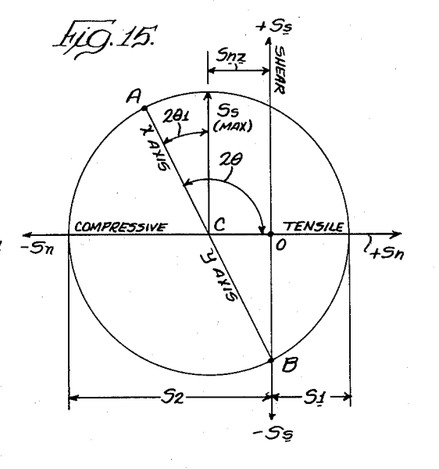
Fig. 15 illustrates a Mohr circle of combined stresses for the case where the coefficient of friction is $u=1.00$.

The variation of the intensity of shear stress and normal stress with the angular position $\theta$ can be diagrammatically illustrated by means of a Mohr circle of combined stress. Fig. 15 shows this diagrammatic illustration for the case of $u=1.0$. By reference to the isolated cube of material depicted in Fig. 12, it will be seen that where $u=1.0$, $Ss=Sc$, or
$Sxy=Sx$ On the diagram illustrated in Fig. 15 vertical distances correspond to shear stresses and horizontal distances, normal stresses. The point A is therefore plotted with equal coordinates, with $Sn$ negative because the normal stresses are compressive rather than tensile. On the other hand, the abscissa of B is zero, because no normal stress is assumed on the vertical faces of the cube of material, but the ordinant of B is the shear stress $Sxy$.

Interpreting the diagram illustrated in Fig. 15, the maximum or principal normal stress is compressive, and is oriented 58°—17" clockwise from the X axis, and has a value of 1.62 $Sx$. From the diagram it may be determined that the maximum tensile stress is 0.62 $Sx$ and it occurs on the plane perpendicular to the principal compressive stress as indicated.

Maximum shear stress, on the other hand, occurs at an angle of 26°–34' from the radius C—A on the diagram illustrated as Fig. 15. Since this angle is twice the angle $\theta_1$ on the cube, the angle $\theta_1$ becomes 13°—17".

The radius of the Mohr circle is the maximum intensity of shear stress on this plane, and it is equal to 1.12 $Sx$; that is, the maximum shear stress is 112% of $Sx$, the compressive stress between the cutting edge and the work.

From the foregoing, it is determined that with a coefficient of friction equal to 1.0 between the tool and the workpiece, a negative true rake angle of 13°—17" for the tool face produces a plane of maximum shear coincident with a horizontal plane, that is, in the plane of the machined surface.

Referring again to Fig. 14, the chart illustrates the relation between coefficient of friction, $u$, and orientation of the plane of maximum shear stress. This chart is used here to diagrammatically illustrate the variation in negative rake angles which produce a plane of shear coincident with the horizontal plane, that is, in the plane of the machined surface. Thus, where ($u$), the coefficient of friction between the tool face and the workpiece, is equal to 1.0, the negative true rake angle required for the tool face is 13.3°. This chart may be interpreted to show that as the coefficient of friction ($u$) increases, the negative true rake angle required to produce the condition of coincident plane of maximum shear and plane of machined surface, decreases rather gradually.

Using this same chart Fig. 17, the theoretical negative rake angle required to produce the plane of maximum shear coincident with the machined surface, may be determined for various metals and cutting materials. Having the coefficient of friction, the negative rake angle required for the tool face may be immediately computed.

Referring again to Figs. 1 and 2, it will be observed particularly as illustrated in Fig. 2, that in keeping with the discovery of this invention, there is developed leading the cutting edge, a progressive cleavage or fracture F lying substantially in the plane of the machined surface. As the work moves towards the tool, with some plastic flow of the metal at the cutting edge, this new type of negative rake cutting with which we are here concerned causes the build up of shear stress to a point substantially equal to the ultimate shear strength of the material. At this point, fracture occurs, and it is likely there is a type of slippage between the metal above the cutting plane and that below. Assuming the metal actually parts on this plane, the split or cleavage F may become a severe stress concentration tending to propagate the fracture.

The intensity of stress decreases with distance from the cutting edge of the tool, and accordingly, the fracture F penetrates only a short distance along the plane of the cut. Of course, once the metal is parted horizontally ahead of the cutting edge, it is both easier for the tool face to raise the chip and for the work to move towards the tool.

With this new type of negative rake cutting which has been discovered, there is only intermittent cutting of the metal by the tool in the conventional sense. The balance of the cutting is a type of cleavage which relieves the tool of appreciable load and wear.

Physical evidence of intermittent fracture in a plane of maximum shear coincident with the machined surface is left on the metal chips produced by a tool constructed in keeping with the present invention. Reference is made to Figs. 18–20, photomicrographs of segmental chips removed by a carbide planing tool constructed with a negative true rake angle selected to produce this new type of negative rake cutting in cast iron. These photomicrographs enable a metallurgical study of the chips.

Figure 18:
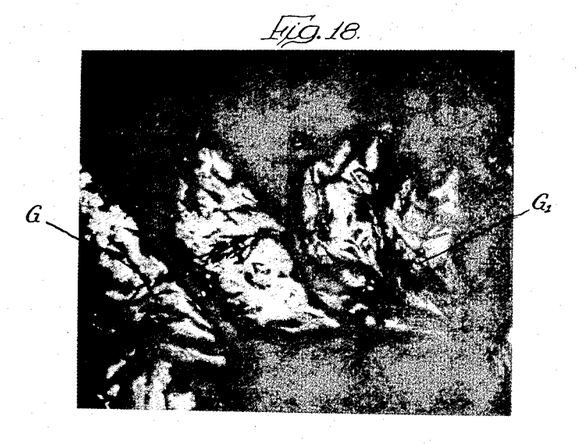
Figs. 18, 19 and 20 are photomicrographs of segmental chips removed by the carbide cutting tool of Figs. 3–9 from grey cast iron.

Several chips are shown in the general Figure 18, a cross-section view at low power, and are revealed to be of the "discontinuous" or "segmental" type characteristic of machining cast iron. From the distortion of the graphite flakes G, it may be noted that there is some plastic flow of the pearlitic matrix, and it also may be observed this occurs usually some distance from the working face, the working face in this photograph being at the bottom. It also may be observed there is considerable fracturing, originating at the graphite flakes, for example at point $G_1$.

Figure 19:
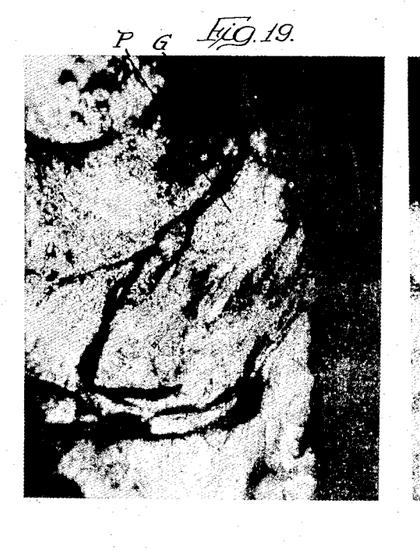

Fig. 19, a cross-section of a portion of one chip taken at higher magnification, is an example of plastic flow at the tool-metal interface, which is at the side of the figure. In this view, the pearlitic matrix P is distorted as are the graphite flakes G, and some fracturing is also present. This plastic flow originates because of the frictional drag at the interface and is expected to develop in all chips machined from cast iron with a planing tool.

Figure 20:
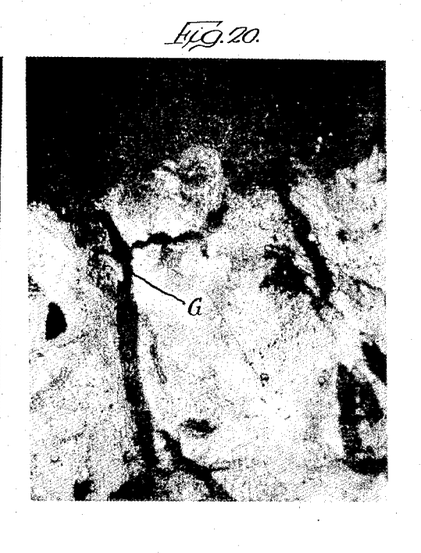

Notwithstanding that such plastic flow is expected to be evidenced on all chips produced in such a planing operation, Fig. 20, also at higher magnification, illustrates a chip portion where no plastic flow has developed at the tool-metal interface, which in this photograph appears at the top. In addition, there is clear evidence of fracturing at the ends of the graphite flakes G. This figure illustrates a second form of chip produced by a planing tool constructed as aforesaid, to produce this new type of negative rake cutting. It has been found that in more than half the chips produced in machining cast iron, there is no evidence of plastic flow as shown in Fig. 19, and the chips assume the form illustrated in the microphotograph, Fig. 20. In other words, more than half the chips produced by such a tool leave evidence of having been parted from the parent metal by way of a fracture or cleavage.

As described hereinbefore, in one aspect of the invention I am concerned with the new type of negative rake cutting which it has been discovered may be produced by orienting the tool face with respect to the workpiece in such a way as to produce a plane of maximum shear leading the cutting edge and substantially in the plane of the machined surface. A single point cutting tool constructed with a negative rake angle which produces cutting action superior to that expected from carbide cutting tools having angles arranged in accordance with conventional shop practice has lead to the aforementioned discovery. Reference is therefore made at this point to Figs. 3–9 where this exemplary tool is depicted.

*Exemplary single point cutting tool having the tool face oriented at a negative true rake angle such as to produce in the planing of metal the new type of negative rake cutting of this invention*

A single point cutting tool producing this new type of negative rake cutting in operation on cast iron and certain other metals, is illustrated in Figs. 3–9. Reference also may be made to Figs. 1 and 2, where a tool of this type is shown mounted above the workpiece, and performing a planing operation. Fig. 2 illustrates the development of the chip, and particularly the progressive fracture or cleavage F which precedes the cutting edge and lies in the plane of cut.

As illustrated, this planing tool embodies a tool holder 11, ordinarily made from cold rolled steel supporting a carbide tool bit 12. For securely fastening the tool bit in place, an adjustable clamping arrangement is employed.

In the present instance, the tool holder 11 is of the type illustrated and disclosed in United States Patent No. 2,675,604, issued April 20, 1954, on the application of Harvey R. Plummer. It comprises a bar of generally rectangular cross-section having a recess 14 adjacent the free end of the bar. The bottom of the recess 14 is inclined at a positive angle of 15°, in the illustrative form of the tool shown in Fig. 3, and also as illustrated in Figs. 4–9, with respect to a plane parallel to the top of the tool holder. Housed within this recess 14 are wear plates 15, 16 which respectively serve as bearing seats for the bottom and inner side faces of the tool bit. These parts are so proportioned that the tool bit is inset almost flush with the top surface of the bar. Another recess 19 is situated in proximity to the inner end of the first recess 14 and accommodates a back-up wedge 20 for the bit 12. Still another recess 21, situated in proximity to the inner side edge of the first recess 14, accommodates a hold-down clamp 22 for the tool bit. The wedge 20 and the clamp 22 are adjustably secured by means of cap screws 24, 25 these members being similar in construction and operation to those disclosed in the aforesaid Patent No. 2,675,604.

Figure 4:
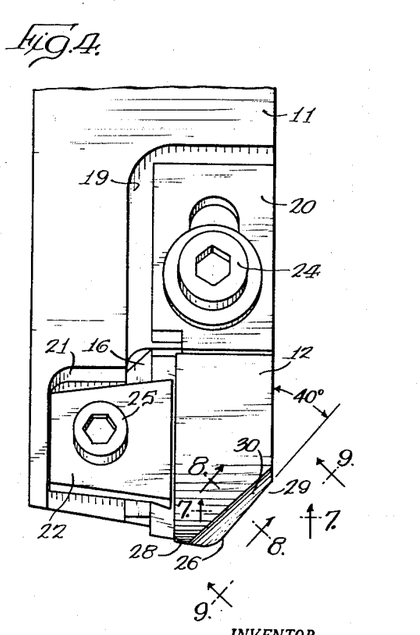
Fig. 4 is a top elevation of the carbide cutting tool illustrated in Fig. 3.

In accordance with the present invention, the bit 12 is fashioned to have a cutting edge 26, disposed at a 40° lead angle (Fig. 4). The end and side portions 28, 29 of the bit 12 below the cutting edge 26, as viewed in this figure (rearwardly of the cutting edge with the tool disposed in planing position), are relieved at relief angles of 3° to 5° as in a conventional manner. The bit 12 is bevelled to form a tool face 30 inclined at a negative rake angle with respect to the workpiece, as may be noted in Figs. 2 and 5.

Figures 6, 8:
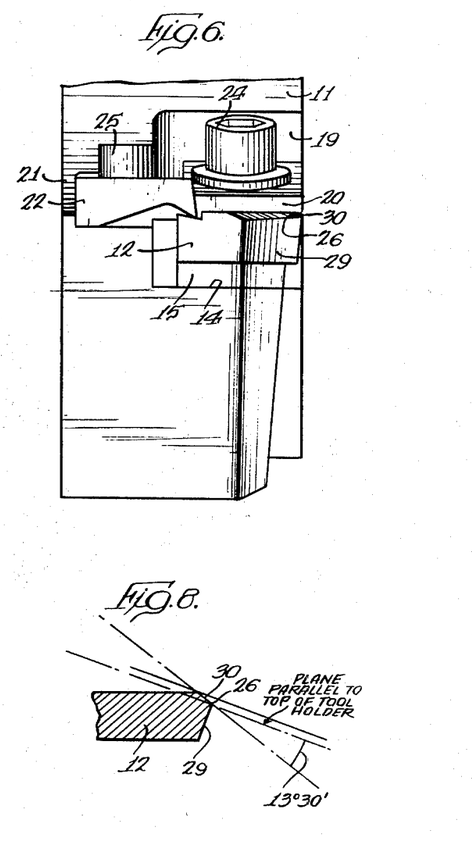
Fig. 6 is a front elevation of this tool taken in the plane of line 6—6 of Fig. 5.
Fig. 8 is another section taken through the tool bit, in the plane of lines 8—8 of Fig. 4, and illustrates the true rake angle.

Referring to the definitions of tool angles given previously, it will be noted that the plane passing through lines 8—8 of Fig. 4 is the plane in which the true rake angle of the tool face is measured, this angle being indicated in Fig. 8 as comprising substantially 13°—30".

The plane passing through lines 7—7 of Fig. 4, according to the definitions of tool angles given previously, is the plane in which the side rake angle is measured. Accordingly, reference is made to Fig. 7 which illustrates the side rake angle found on the tool bit of the drawings as being substantially 16°—32".

As indicated earlier herein, the bottom of the recess 14 beneath the bit 12 is disposed at a positive angle of 15° with respect to the plane of the top of the tool holder 11. Since the top and bottom faces of the bit 12 are parallel, and because of the angular disposition of the cutting edge 26, the back rake angle, illustrated in Fig. 5 comprises negative 2.9°.

In Fig. 9, the angle of inclination of the cutting edge is shown.

With the tool angles provided on the single point cutting tool illustrated in the drawings, Figs. 3-9, in planing operations on cast iron and certain steels, the carbide planing tool there shown is capable of being operated at high surface speeds and at high feed rates, requiring substantially less power to operate it and having long cutting edge life. For purposes of comparing this tool with one constructed in keeping with conventional shop practice, reference is made to Fig. 16, a chart illustrating diagrammatically the tool angles employed on this tool, and the tool angles recommended for carbide planing tools and frequently used in industry. For example, tool angles which have been recommended for soft steel, less than 200 Brinnell, fall in the upper right hand quadrant of this chart, as indicated by I. Thus for such steels, the side rake angles range from positive 4° to positive 15° while the back rake angle is from 0° to positive 10°.

Similarly, the tool angles for medium hard steel, 351–425 Brinell, fall in both the lower quadrants as indicated at II in this chart.

Figure 5:
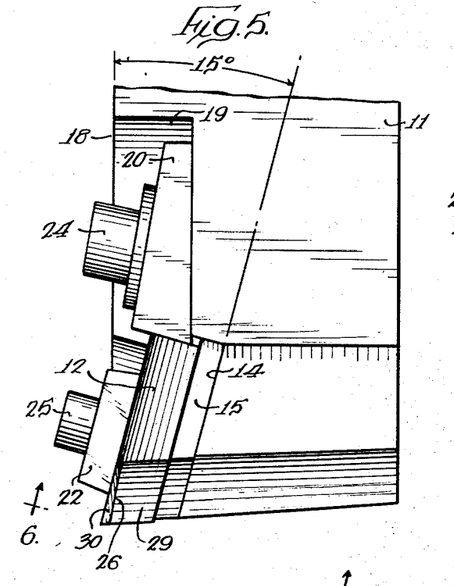
Fig. 5 is a side elevation of the tool of Fig. 3.
Figure 7:
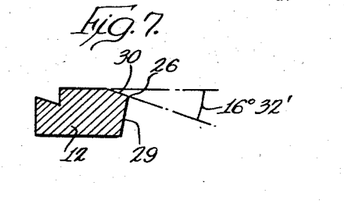
Fig. 7 is a section taken through the carbide tool bit of the cutting tool illustrated in Figs. 3–6, and illustrates the side rake angle.

As indicated in the drawings, particularly Figs. 7 and 5, the side rake angle and back rake angle of the planing tool there shown, are negative 16°—32″ and negative 2.9°, respectively. This point lies in the lower left hand quadrant of the chart of Fig. 16, to the left of the angles shown, as recommended by a standard authority.

Furthermore, while the recommended tool angles for cutting various metals as indicated on the chart range over a substantial area, as demonstrated by this chart, the present invention is based upon the discovery that by selecting particular tool angles an improved type of negative rake cutting may be caused to be produced in metal. Accordingly, by selecting a true negative rake angle in accordance with the chart Fig. 14, which illustrates the relation between orientation of the tool face and the coefficient of friction between the tool and the chip, tool angles may be obtained for producing this new type of negative rake cutting depending upon the material of the tool bit and the material to be machined. These tool angles, of course, vary in accordance with the coefficient of friction as set forth in Equation 8 from the mathematical analysis and explanation of the new type of rake cutting presented hereinbefore.

In order to compute the negative rake angle required to produce this new type of negative rake cutting for a carbide cutting tool, it is necessary to have the coefficient of friction. Data has been obtained for a carbide tool cutting SAE 4340 steel at 542 feet per minute, with rake angles of positive 10° and negative 10°. For these conditions the coefficient of friction, according to empirical tests, varies from 0.75 to 1.20. This can be taken as an average of about 1.0.

Figure 14:
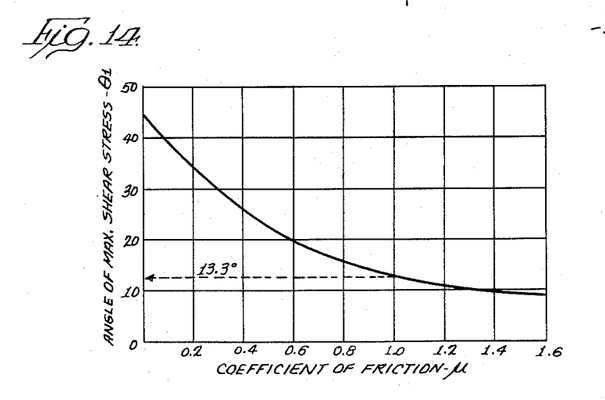
Fig. 14 is a chart showing the relation of the orientation of the plane of maximum shear with the coefficient of friction between the tool and workpiece.

Accordingly, for this steel, the negative true rake angle as determined from the chart of Fig. 14 for a carbide cutting tool for machining this type steel is indicated as 13°—17″. This is substantially the same as the 13°—30″ given for the negative true rake angle of the cutting tool depicted in Figs. 3–9.

The tool shown in these figures has been used in the machining of cast iron and certain steels, as follows:

Low carbon steels, such as SAE 1020
Medium carbon steels, such as SAE 1035, 1040, 1060
Die steels—Alloy steels of high carbon content For purposes of comparison of the productivity of the tool shown in these figures of the drawings with tools constructed in keeping with ordinary shop practice, the following example is given. For practical rough planing of cast iron parts, with a conventional planing tool with brazed or clamped on bit, 100 to 120 feet per minute was the usually recommended surface speed. With the tool of this invention speeds of 200 to 300 feet per minute have been used with satisfactory tool life. In terms of productivity this constitutes a doubling of the rate of metal removal.

From the foregoing, it will be seen that the exemplary tool of the present invention not only has the advantage of known carbide cutting tools with negative rake angles, of a reinforced cutting edge the result of the added material in back of it, but produces in operation the new type of negative rake cutting which has been described and analyzed hereinbefore. Thus, with a negative rake angle of 13°—30″ on the single point cutting tool of Figs. 3–9, the plane of maximum shear is caused to lie coincident with the plane of the machined surface for cast iron and certain steels as set forth previously. In these materials this tool produces the new type of negative rake cutting. The orientation of the tool bit surfaces produces a smooth flow of chips, as well as obtaining increased life of the cutting edge. The tool holder for supporting this tool bit is such as to lend additional support for the cutting edge and contributes to the increased productivity of the tool by providing such a support as will resist wear and cracking due to large variations in temperature and imposition of shock loads of substantial magnitude. These advantageous characteristics have been established in actual service use of the improved single point cutting tool.

I claim as my invention:

1. The method of machining ferrous metals with a carbide cutting tool including a carbide bit adapted to be mounted on a tool holder; comprising the steps of fashioning said bit so that the latter presents a cutting edge arranged at an acute lead angle, a single point at the termination of said cutting edge which is adapted to be presented to the workpiece, and a tool face oriented relative to the cutting edge at a negative true rake angle of substantially 13°—30″; and machining the workpiece by moving the carbide bit mounted on a tool holder and the workpiece relative to each other so as to cause the plane of shear in advance of the cutting edge to lie substantially coincident with the surface left by the cutting edge.

2. The method of machining a ferrous metal workpiece with a carbide cutting tool comprising, providing a carbide bit, fashioning said carbide bit to provide a cutting edge arranged at an acute lead angle and terminating in a single point which is adapted to be presented to the workpiece, and a tool face oriented at a negative rake angle of a magnitude such as to cause, in the predetermined metal of the workpiece at a predetermined cutting speed, the plane of shear in advance of the cutting edge to lie coincident with the surface left by the cutting edge, said angle being substantially $$\frac{1}{2}\tan^{-1}\left(\frac{1}{2u}\right)$$

where $u$ is the coefficient of friction between the bit and the workpiece material at said predetermined cutting speed, mounting the carbide bit on a tool holder to form a carbide cutting tool, positioning said carbide cutting tool for machining the workpiece, and machining the workpiece by moving said workpiece and carbide cutting tool relative to each other.

3. The method of machining ferrous metals by removing a layer of metal from a workpiece, comprising, providing a carbide bit, fashioning said bit to provide a major cutting edge positioned at an angle of inclination of about 10° and at a lead angle of about 40° and terminating in a single point providing a minor cutting edge;

and a tool face adjacent said cutting edges oriented at a negative true rake angle of substantially 13°—30"; and machining the workpiece by holding said carbide bit in cutting relation with the workpiece, and moving the carbide and workpiece relative to each other so that the carbide bit develops a plane of maximum shear in advance of the cutting edges substantially coincident with the surface left by the major cutting edge.

References Cited in the file of this patent

UNITED STATES PATENTS

| | | |
|---|---|---|
| 2,321,441 | Webber | June 8, 1943 |
| 2,359,717 | Simpson | Oct. 3, 1944 |
| 2,414,231 | Kraus | Jan. 14, 1947 |
| 2,577,043 | Steeffes | Dec. 4, 1951 |
| 2,649,818 | Kaiser | Aug. 25, 1953 |
| 2,675,604 | Plummer | Apr. 20, 1954 |

OTHER REFERENCES

Text: "Tool Engineer's Handbook," published by McGraw-Hill Book Co., Inc., in 1949, sec. 17 entitled "Principles of Metal Cutting and Machinability," contained on pages 302–356.

Article: "Negative Strength Land," from the Magazine "Steel," Dec. 11, 1944, page 134.

Article: "Bearing Lands and Negative Rakes Prolong Cutting Tool Life," by Mark W. Purser, from "The American Machinist Magazine," pgs. 118–121, August 2, 1945.

Article: "High-Speed Milling with Negative Rake Angles," by Hans Ernst, from Mechanical Engineering, May, 1944, pgs. 295–299.